US012110935B2

(12) United States Patent
Schemer et al.

(10) Patent No.: US 12,110,935 B2
(45) Date of Patent: Oct. 8, 2024

(54) ASSEMBLY BEARING

(71) Applicant: Vibracoustic AG, Darmstadt (DE)

(72) Inventors: Thomas Schemer, Weinheim (DE); Van-Hieu Le, Mannheim (DE)

(73) Assignee: Vibracoustic SE, Darmstadt (DE)

( * ) Notice: Subject to any disclaimer, the term of this patent is extended or adjusted under 35 U.S.C. 154(b) by 959 days.

(21) Appl. No.: 15/734,832

(22) PCT Filed: Apr. 11, 2019

(86) PCT No.: PCT/EP2019/059246
§ 371 (c)(1),
(2) Date: Dec. 3, 2020

(87) PCT Pub. No.: WO2019/233659
PCT Pub. Date: Dec. 12, 2019

(65) Prior Publication Data
US 2021/0231187 A1    Jul. 29, 2021

(30) Foreign Application Priority Data
Jun. 6, 2018  (DE) .......................... 102018113503.3

(51) Int. Cl.
*F16F 1/38* (2006.01)
*B60K 5/12* (2006.01)

(52) U.S. Cl.
CPC .......... *F16F 1/3842* (2013.01); *B60K 5/1208* (2013.01); *B60G 2204/41* (2013.01); *B60K 5/1291* (2013.01); *F16F 2226/041* (2013.01)

(58) Field of Classification Search
CPC .... F16F 1/3842; F16F 2226/041; F16F 3/087; F16F 1/3863; F16F 1/3835; F16F 15/08;
(Continued)

(56) References Cited

U.S. PATENT DOCUMENTS

| 863,887 A | * | 8/1907 | Stuttle | F16L 21/06 285/373 |
| 2,626,797 A | * | 1/1953 | Cuskie | B60G 21/0551 267/189 |

(Continued)

FOREIGN PATENT DOCUMENTS

| CN | 1683806 A | 10/2005 |
| CN | 1740585 A | 3/2006 |

(Continued)

OTHER PUBLICATIONS

EP Office Action dated Jul. 10, 2023, EP 19718631.5 (w_English_translation).

(Continued)

*Primary Examiner* — Bradley T King
*Assistant Examiner* — James K Hsiao
(74) *Attorney, Agent, or Firm* — Fishman Stewart PLLC (57) ABSTRACT

An assembly bearing for a motor vehicle assembly includes an inner part, an elastomer supporting body in which the inner part is embedded, and an outer part that surrounds the supporting body. In embodiments, the outer part includes a first part and a second part that are clipped to at least one fastening element connected to the supporting body.

21 Claims, 5 Drawing Sheets

(58) Field of Classification Search
CPC ........ F16F 1/384; F16F 1/387; B60K 5/1208; B60K 5/1233; B60K 5/1283; B60K 5/1291; B60G 2204/41044; B60G 2204/41043
See application file for complete search history.

(56) References Cited

U.S. PATENT DOCUMENTS

| | | | | |
|---|---|---|---|---|
| 4,397,507 | A * | 8/1983 | Kraus | F16C 33/4635 |
| | | | | 384/577 |
| 5,013,166 | A * | 5/1991 | Domer | B60G 21/0551 |
| | | | | 384/220 |
| D317,558 | S * | 6/1991 | Daigle | D8/394 |
| 5,192,039 | A * | 3/1993 | Williams | F16L 59/135 |
| | | | | 248/62 |
| 5,286,011 | A * | 2/1994 | Strand | F16F 13/20 |
| | | | | 267/219 |
| 5,437,439 | A * | 8/1995 | Brokamp | B60G 11/10 |
| | | | | 267/293 |
| 5,520,465 | A * | 5/1996 | Kammel | F16C 33/20 |
| | | | | 267/293 |
| 5,842,687 | A * | 12/1998 | David | F16F 1/3863 |
| | | | | 267/153 |
| 5,884,926 | A * | 3/1999 | Muzio | B60G 21/0551 |
| | | | | 267/189 |
| D412,336 | S * | 7/1999 | Bakoledis | D8/394 |
| 6,007,058 | A * | 12/1999 | Kokubo | F16B 17/008 |
| | | | | 248/634 |
| 6,085,394 | A * | 7/2000 | Hartman | F16L 33/035 |
| | | | | 285/903 |
| 6,105,216 | A * | 8/2000 | Opperthauser | F16L 3/243 |
| | | | | 248/74.1 |
| 6,142,923 | A * | 11/2000 | Bakoledis | B31B 50/00 |
| | | | | 492/30 |
| 6,318,708 | B1 * | 11/2001 | Wolf | F16F 9/3415 |
| | | | | 267/140.12 |
| 6,595,473 | B2 * | 7/2003 | Aoki | B60R 16/0215 |
| | | | | 138/108 |
| 6,755,405 | B2 * | 6/2004 | Kammel | F16F 1/3842 |
| | | | | 267/141.1 |
| 6,761,189 | B2 * | 7/2004 | Berninger | B25J 19/0025 |
| | | | | 138/104 |
| 6,854,723 | B2 * | 2/2005 | Ogawa | F16F 1/3842 |
| | | | | 267/141.5 |
| 6,971,640 | B2 * | 12/2005 | Joseph | B60G 21/0551 |
| | | | | 267/257 |
| 7,108,254 | B2 * | 9/2006 | Kumper | B60G 21/0551 |
| | | | | 267/276 |
| 7,119,275 | B2 * | 10/2006 | Suzuki | H02G 3/0691 |
| | | | | 138/108 |
| 7,275,738 | B2 | 10/2007 | Minamisawa | |
| 7,458,726 | B2 * | 12/2008 | Seilheimer | F16C 17/022 |
| | | | | 384/276 |
| 7,546,986 | B2 * | 6/2009 | Kim | F16L 3/1008 |
| | | | | 248/62 |
| 7,591,286 | B2 * | 9/2009 | Howard | H02G 9/065 |
| | | | | 138/167 |
| 7,793,893 | B2 * | 9/2010 | Opperthauser | F16L 59/135 |
| | | | | 248/65 |
| 7,866,639 | B2 * | 1/2011 | Endo | F16F 13/14 |
| | | | | 267/219 |
| 8,038,540 | B2 * | 10/2011 | Hoeks | F16F 15/1442 |
| | | | | 403/1 |
| 8,057,105 | B2 * | 11/2011 | Earthrowl | F16C 33/56 |
| | | | | 384/573 |
| 8,376,332 | B2 * | 2/2013 | Scharf | F16F 1/3828 |
| | | | | 267/281 |
| 8,381,361 | B2 * | 2/2013 | Serna-Gongora | F16L 3/133 |
| | | | | 24/20 R |
| 8,763,648 | B2 * | 7/2014 | Senkpiel | F16L 59/135 |
| | | | | 138/149 |
| 8,882,092 | B2 * | 11/2014 | Jang | B60G 21/0551 |
| | | | | 267/141 |
| 9,200,690 | B2 | 12/2015 | Eguchi et al. | |
| 9,512,893 | B2 * | 12/2016 | Yahata | F16F 1/3849 |
| 9,528,566 | B2 * | 12/2016 | Schnaars | F16F 13/16 |
| 9,546,705 | B2 * | 1/2017 | Ishimatsu | F16F 1/3835 |
| 9,574,702 | B2 * | 2/2017 | Steinhorst | F16L 59/143 |
| 9,702,411 | B2 * | 7/2017 | Polanco | F16C 23/046 |
| 10,184,512 | B2 * | 1/2019 | Palluck | F16C 33/64 |
| 10,415,666 | B2 * | 9/2019 | Nishi | F16F 1/3835 |
| 10,611,227 | B2 * | 4/2020 | Kim | F16F 13/10 |
| 2002/0186905 | A1 * | 12/2002 | Kammel | F16F 1/3873 |
| | | | | 384/220 |
| 2003/0136891 | A1 * | 7/2003 | Thullen | B60T 8/3685 |
| | | | | 248/316.5 |
| 2006/0061023 | A1 | 3/2006 | Power | |
| 2006/0091595 | A1 * | 5/2006 | Hayashi | F16F 1/371 |
| | | | | 267/276 |
| 2008/0067727 | A1 * | 3/2008 | Schwarz | F16F 1/3842 |
| | | | | 267/141.1 |
| 2009/0265895 | A1 * | 10/2009 | Box | F16L 3/1222 |
| | | | | 24/20 R |
| 2010/0276853 | A1 * | 11/2010 | Visage | F16F 1/387 |
| | | | | 267/140.4 |
| 2011/0164839 | A1 * | 7/2011 | Scharf | F16F 1/3821 |
| | | | | 384/220 |
| 2012/0181413 | A1 * | 7/2012 | Steinhorst | F16L 59/143 |
| | | | | 248/636 |
| 2013/0164077 | A1 * | 6/2013 | Kondor | F16F 1/3873 |
| | | | | 403/221 |
| 2013/0243358 | A1 * | 9/2013 | Stork | F16C 43/04 |
| | | | | 384/445 |
| 2014/0145384 | A1 * | 5/2014 | Tiilikainen | B62B 5/0009 |
| | | | | 267/141 |
| 2014/0210148 | A1 * | 7/2014 | Eguchi | F16F 1/3828 |
| | | | | 267/141 |
| 2015/0323031 | A1 * | 11/2015 | Yahata | F16F 1/3863 |
| | | | | 267/141.2 |
| 2017/0051782 | A1 * | 2/2017 | Jones | F16C 17/10 |
| 2017/0051804 | A1 | 2/2017 | Zimmerman et al. | |
| 2017/0284501 | A1 * | 10/2017 | Kadowaki | B60K 5/1208 |
| 2018/0087567 | A1 * | 3/2018 | Palluck | F16C 33/64 |
| 2018/0172109 | A1 * | 6/2018 | Nishi | F16F 1/3835 |
| 2018/0283909 | A1 * | 10/2018 | Cerniway | G01V 1/201 |
| 2018/0320753 | A1 * | 11/2018 | Beckmann | B60K 5/1208 |
| 2019/0338826 | A1 * | 11/2019 | Kolenda | F16F 13/1472 |
| 2019/0366825 | A1 * | 12/2019 | Kim | B60K 5/1233 |
| 2020/0370599 | A1 * | 11/2020 | Koczar | F16C 33/08 |

FOREIGN PATENT DOCUMENTS

| | | |
|---|---|---|
| CN | 205047721 U | 2/2016 |
| DE | 9216981 U1 | 3/1993 |
| DE | 20315477 U1 | 12/2003 |
| DE | 102004051112 B3 | 6/2006 |
| DE | 102004056884 A1 | 6/2006 |
| DE | 102005058632 A1 | 6/2007 |
| DE | 102011001235 A1 | 9/2012 |
| DE | 112013004246 T5 | 7/2015 |
| DE | 102015016454 A1 | 6/2017 |
| EP | 1586789 A1 | 10/2005 |
| EP | 1628040 A1 | 2/2006 |
| JP | H0654936 U | 7/1994 |
| JP | 2000-225941 A | 8/2000 |
| JP | 2010-14258 A | 1/2010 |
| JP | 2010138949 A | 6/2010 |
| JP | 201315151 A | 1/2013 |
| JP | 201564013 A | 4/2015 |
| WO | 06/037096 A2 | 4/2006 |

OTHER PUBLICATIONS

International Search Report, PCT/EP2019/059246, dated Jun. 28, 2019.

German Office Action, 10 2018 113 503.3, Dated Nov. 19, 2018 (in German).

(56) References Cited

OTHER PUBLICATIONS

Second German Office Action, 10 2018 113 503.3, Dated Mar. 17, 2020 (in German).
CN Office Action, 201980037362.9, dated Jan. 13, 2022, with translation.
Japanese Office Action, 2020-568338, dated Dec. 20, 2021, with translation.
Japanese Office Action, 2020-568338, dated Aug. 3, 2022, with translation.
Chinese Office Action and Search Report dated Dec. 1, 2022 for Chinese Patent Application No. 201980037362.9 with English translation.
CN Office Action, 201980037362.9, dated Jul. 22, 2022 with translation.

\* cited by examiner

Fig. 14

ASSEMBLY BEARING

CROSS-REFERENCE TO RELATED APPLICATIONS

This application is a National Stage Patent Application of International Patent Application No. PCT/EP2019/059246, filed Apr. 11, 2019, which claims the benefit of German Application Serial No. 10 2018 113 503.3, filed Jun. 6, 2018, the contents of each are incorporated by reference in their entireties.

TECHNICAL FIELD

The invention relates to an assembly bearing for a motor vehicle assembly, having an inner part, an elastomeric supporting body in which the inner part is embedded, and an outer part which surrounds the supporting body.

BACKGROUND

An assembly bearing of the type mentioned in the introduction is used to support a motor vehicle assembly, such as, for example, an internal combustion engine, a transmission or an electric motor, on a motor vehicle body. An assembly bearing also increases the drive comfort by insulating the vibrations generated by the motor vehicle assembly and damping roadway excitations.

Conventional assembly bearings have an inner part which can be connected to the motor vehicle assembly, an elastomeric supporting body which acts as insulation and damping element, and an outer part. The outer part can be an outer sleeve which can be of multi-part configuration.

For example, DE 10 2005 058 632 A1 discloses a round bearing which has an inner bushing, an elastomeric bearing element and an outer bushing, wherein the outer bushing is composed of two halves which are clipped to one another at their ends.

In order to delimit the movements of the inner part relative to the outer part, it is known to provide stops. As a result, the service life of the elastomeric supporting body and thus of the assembly bearing is increased.

DE 11 2013 004 246 T5 discloses a rubber bushing which comprises an inner shaft element and intermediate rings which are connected to one another via a rubber body. The rubber body is connected to an outer cylindrical element, which is divided in half and comprises a pair of cylinders. The pair of cylinders are connected to one another by fitting protrusions and fitting holes. In order to delimit the movement of the inner shaft element, provision is made of stopper elements which are connected to the shaft element.

In addition, DE 10 2015 016 454 A1 discloses an elastic bearing with an elastomeric metal element which comprises a dimensionally stable inner bearing core and a hollow cylindrical outer shell, wherein the outer shell is formed of two shell halves. The two shell halves have longitudinal gap edges and axially offset tongues which slide under the other shell half if the outer shell is pressed into a tubular bearing housing in order to build up a preload, with the result that the longitudinal gap edges bear against one another. Crowned elastomeric stops are fixedly adhered to the inner bearing core, said stops delimiting a movement of the elastomeric metal element relative to the outer shell.

In the case of the aforementioned bearings, the installation space required for the stops is not sufficient to satisfy the technical requirements with regard to the damping and impact characteristics. Stops placed on from the outside also have the disadvantage that the fastening is possible only with difficulty and in a process-intensive manner. Additional components also cause additional costs.

SUMMARY

The invention includes embodiments of an assembly bearing which provides sufficient installation space for the integration of stops and which is also cost-effective.

This object is achieved by an assembly bearing having features disclosed herein.

Advantageous configurations of the assembly bearing are also disclosed herein.

An assembly bearing for a motor vehicle assembly has an inner part, an elastomeric supporting body in which the inner part is embedded, and an outer part which surrounds the supporting body, wherein the outer part has a first part and a second part which are clipped to at least one fastening element which is connected to the supporting body.

As a result of the joining of the two parts, a geometry which encircles the supporting body is produced, said geometry generating an undercut and as a result an overlap. The overlap can be utilized as a stop. Since no additional installation space or additional components causing additional costs are required for the stops, the installation space-related requirements can be met in a simple manner. Furthermore, the clipping of the two parts to the fastening element makes it possible to fasten the two parts to the supporting body in a simple manner. A cost-effective transport securing action for the two parts is also provided as a result of the clipping.

The parts advantageously have abutment surfaces via which said parts are in contact with one another. Furthermore, the outer part is advantageously configured in the form of an outer sleeve. Furthermore, the supporting body advantageously has at least one supporting spring to which the fastening element is fixed. In addition, the supporting body can have two fastening elements. The supporting body can thus have two supporting springs, wherein one fastening element is fixed to each supporting spring.

In an advantageous configuration, at least one of the parts has at least one stop on an inner circumferential surface which faces the supporting body. As a result, the internal stops are integrated in the existing components, such that no additional installation space or additional components, which cause additional costs, are required. The stop can be configured in the form of a shoulder which projects from the inner circumferential surface. The stop can also be configured in the form of an indentation which is introduced into the part and which projects radially inward from the inner circumferential surface. Preferably, the at least one stop is generated during the production of the part, for example by forming the part or during the injection molding of the part. Advantageously, the at least one part can have a plurality of stops. Furthermore, each of the parts advantageously has at least one stop on an inner circumferential surface which faces the supporting body.

In an advantageous configuration, the at least one fastening element has at least one pair of protrusions, wherein a first protrusion engages into a cutout of the first part and a second protrusion engages into a cutout of the second part in order to clip the parts to the fastening element. As a result, a simple and cost-effective latching or clip connection is provided, which fixes the parts to the supporting body. Advantageously, the protrusions are of rigid configuration and the parts are of elastic configuration. In order to clip the parts to the fastening element, the parts deflect in an elastic manner, with the result that the protrusions can latch into the orifices and project out of the latter and/or engage behind the latter. Furthermore, the cutouts are advantageously configured in the form of apertures. As a result, the protrusions project out of the cutouts.

In an advantageous configuration, the at least one fastening element has a pair of opposite first protrusions and a pair of opposite second protrusions, wherein the first protrusions engage into cutouts of the first part and the second protrusions engage into cutouts of the second part in order to clip the two parts to the fastening element. As a result, a secure fastening of the parts to the supporting body is provided. Preferably, the first protrusions and the second protrusions lie on an axis which is orthogonal to a longitudinal axis of the assembly bearing. Furthermore, the cutouts of each part advantageously lie opposite one another. Advantageously, the cutouts of each part lie on an axis which is orthogonal to a longitudinal axis of the assembly bearing. Furthermore, the cutouts are advantageously configured in the form of apertures. As a result, the protrusions project out of the cutouts.

In an advantageous configuration, each protrusion has a lead-in chamfer for insertion into the cutout. This makes assembly of the parts easier. Advantageously, the lead-in chamfer is configured in the form of a chamfer which extends in a conical manner in cross section. As a result, the protrusions are configured in the form of obliquely flattened webs.

In an advantageous configuration, the at least one fastening element has at least one centering element which engages into orifices of the parts in a positively locking manner. As a result, the two half-shells are centered relative to one another during the assembly. It is also ensured that the supporting body always assumes the correct position within the parts. The centering element is preferably arranged between a first protrusion and a second protrusion. Furthermore, the fastening element advantageously has two opposite centering elements, such that a first centering element is arranged between a first protrusion and a second protrusion, and a second centering element is arranged oppositely between a first protrusion and a second protrusion. In an advantageous configuration, the centering element is configured in the form of a web which extends between the first protrusion and the second protrusion in the longitudinal direction of the assembly bearing. Furthermore, in the clipped-together state, the orifices form an opening into which the centering element engages in a positively locking manner.

In an advantageous configuration, each of the parts has a positively locking connecting element and a corresponding receptacle for the connecting element. As a result, a secure positively locking connection between the two parts is provided, said connection effectively preventing the parts from slipping during transport. In an advantageous configuration, the connecting element is configured in the form of a pin element which projects from the part, and the receptacle is configured in the form of a blind hole which is introduced into the part and into which the pin element can be inserted. Furthermore, the connecting element and the corresponding receptacle are advantageously arranged at an abutment surface of the part.

In an advantageous configuration, a depression, into which the fastening element is inserted in a positively locking manner in the clipped-together state, is introduced into an inner circumferential surface of each part. As a result, the supporting body can be fixed in an exact position between the two parts. Advantageously, the depression corresponds to a contour of the fastening element.

In an advantageous configuration, the parts are configured in the form of half-shells and are connected to one another at opposite abutment surfaces. As a result of the horizontal division of the outer part into two half-shell-shaped parts, the supporting body is completely surrounded. In an advantageous configuration, each half-shell surrounds one half of the supporting body.

In an advantageous configuration, the at least one fastening element is connected to the supporting body in a positively locking, force-fitting and/or materially bonded manner. As a result, a secure and sufficient fastening of the fastening element to the supporting body, and thus a secure hold of the two parts on the supporting body, is provided. The fastening element can thus be pressed onto the supporting body and/or adhesively bonded to the supporting body. The elastomer of the supporting body can also be injection-molded or vulcanized onto the fastening element.

In an advantageous configuration, the fastening element is a ring element.

In an advantageous configuration, the fastening element and/or the parts are/is composed of plastic. As a result, the assembly bearing has a low weight and is also cost-effective in terms of production. In addition, the fastening element and/or the parts can be composed of fiber-reinforced plastic. The fastening element and/or the parts can also be composed of metal, or the fastening element can be composed of metal and the parts can be composed of plastic, or the fastening element can be composed of plastic and the parts can be composed of metal.

BRIEF DESCRIPTION OF THE DRAWINGS

The assembly bearing as well as further features and advantages are explained in more detail below on the basis of exemplary embodiments which are illustrated schematically in the figures, in which.

DETAILED DESCRIPTION

FIGS. 1 to 7 show an assembly bearing 10 according to a first embodiment, said bearing being used to mount a motor vehicle assembly (not illustrated), such as, for example, an internal combustion engine, a transmission or an electric motor, on a vehicle body (not illustrated). The assembly bearing 10 insulates the vibrations generated by the motor vehicle assembly and also damps roadway excitations.

Figure 1:
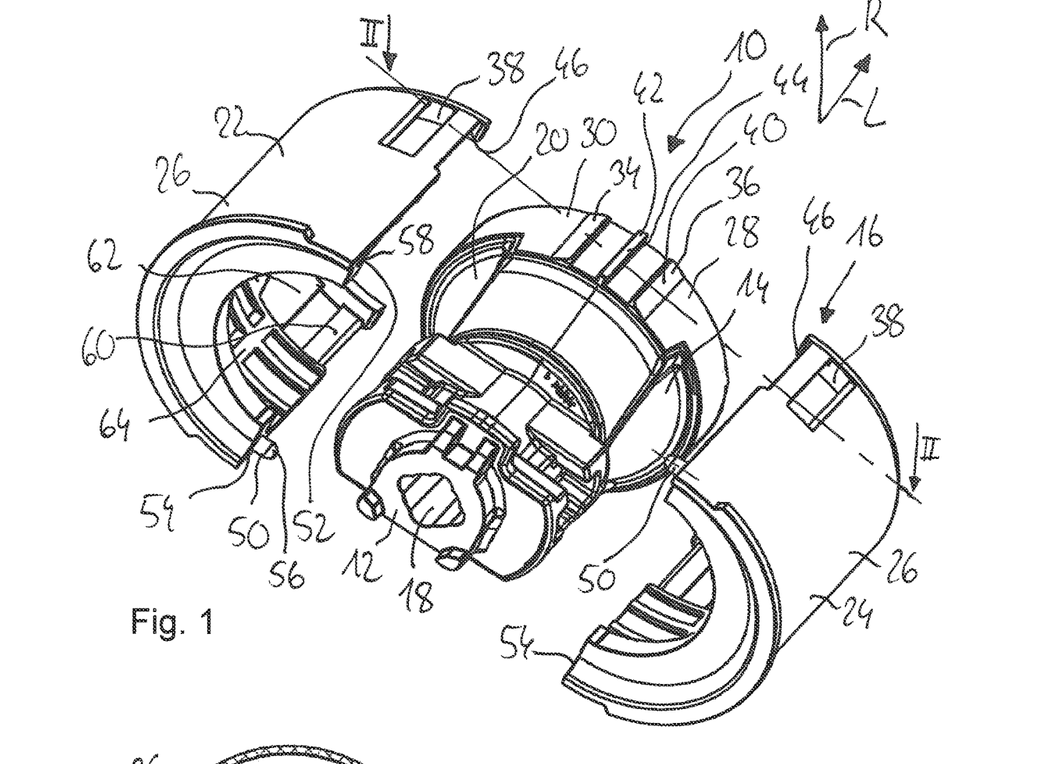
FIG. 1 shows a perspective illustration of an assembly bearing according to a first embodiment with two half-shells which are not clipped together.
Figure 4:
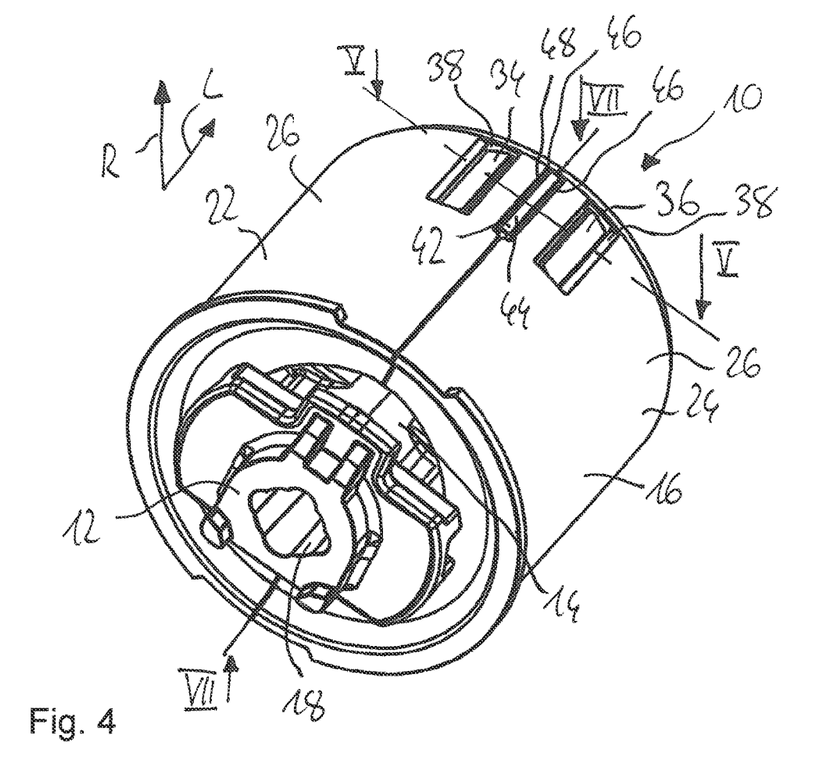
FIG. 4 shows a perspective illustration of the assembly bearing with clipped-together half-shells.
Figure 7:
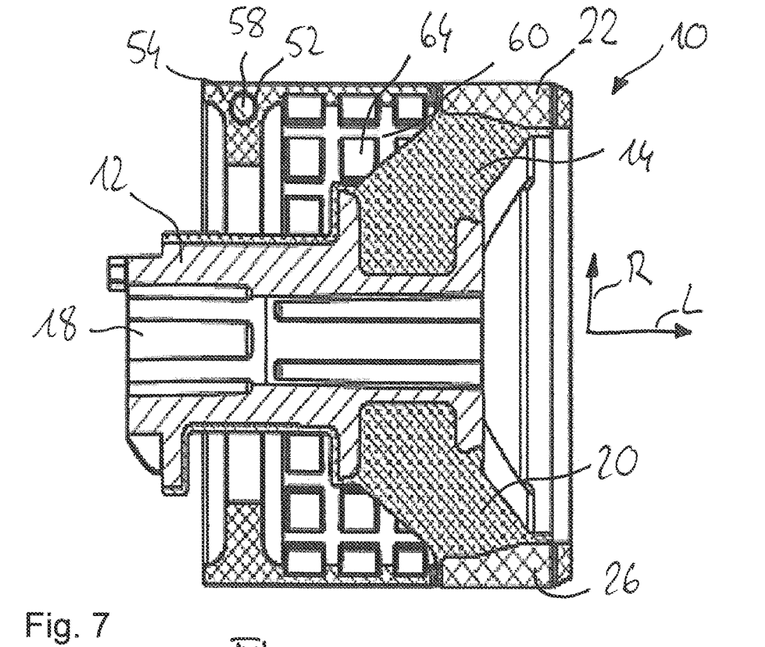
FIG. 7 shows a section along the line VII-VII in FIG. 4.

As can be seen from FIGS. 1, 4 and 7 when considered together, the assembly bearing 10 has an inner part 12, an elastomeric supporting body 14 in which the inner part 12 is embedded, and an outer part 16 which surrounds the supporting body 14.

The inner part 12 is composed of metal and has a passage opening 18 into which a supporting arm or bolt (not illustrated) can be inserted in order to connect the assembly bearing 10 to a motor vehicle assembly.

As can be seen in particular in FIG. 7, the elastomeric supporting body 14 surrounds the inner part 12, wherein the supporting body 14 is connected to the inner part 12 in a materially bonded manner, in particular is injection-molded and/or vulcanized thereon. The supporting body 14 has a first supporting spring 20 which projects from the inner part 12 in the radial direction R.

Figure 2:
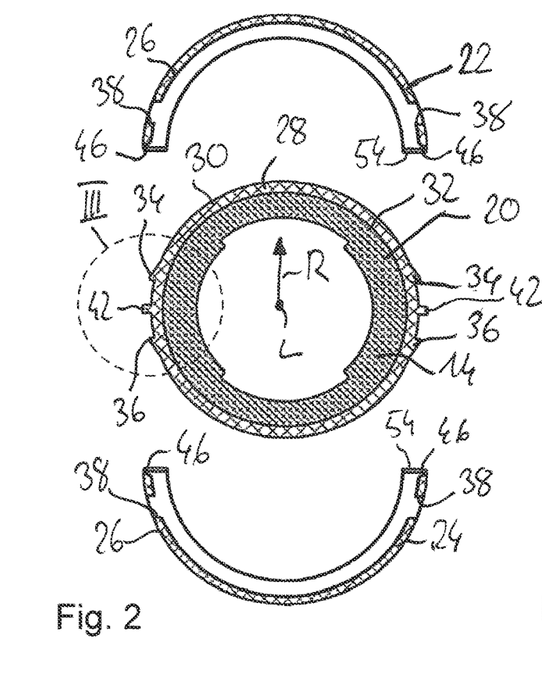
FIG. 2 shows a section along the line II-II from FIG. 1 without inner part.
Figure 5:
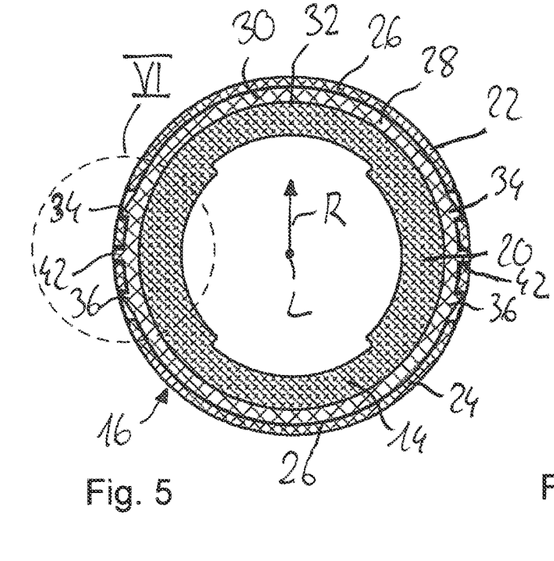
FIG. 5 shows a section through the assembly bearing along the line IV-IV from FIG. 4 without inner part.

In the present case, the outer part 16 is configured in the form of an outer sleeve and has a first part 22 and a second part 24 which, as per FIGS. 1, 2 and 5, are configured in the form of half-shells 26 and are connected to one another at opposite abutment surfaces 54. The two half-shells 26 are composed of plastic, in particular fiber-reinforced plastic, but can also be composed of metal. Each of the half-shells 26 surrounds one half of the supporting body 14.

In order to fasten the two half-shells 26 to the supporting body 14, said body has a fastening element 28 in the form of a ring element 30 which is connected to the first supporting spring 20 in a positively locking, force-fitting and/or materially bonded manner.

Figure 3:
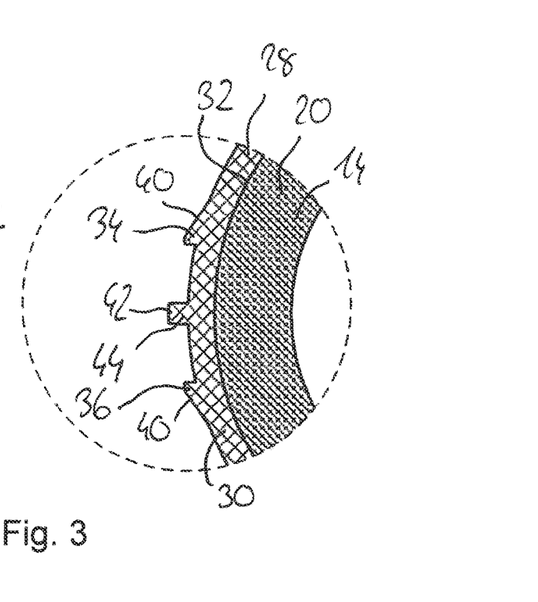
FIG. 3 shows an enlarged illustration of the detail III from FIG. 2.

As can be seen in particular in FIGS. 2 and 3, the ring element 30 is connected to an outer side 32 of the first supporting spring 20, or the ring element 30 surrounds the outer circumference of the first supporting spring 20. The ring element 30 can be pressed onto the outer side 32 of the first supporting spring 20 and/or can be connected thereto in a materially bonded manner, for example by adhesive bonding, by inserting the fastening element 28 into an injection mold and subsequently applying the elastomer of the supporting body 14 by injection molding, or in a 2-component injection-molding process.

As can be seen from FIGS. 1, 2, 3, 4, 5 and 6 when considered together, the two half-shells 26 are clipped to the supporting body 14, in particular to the fastening element 28. To this end, the fastening element 28 has a pair of protrusions 34, 36 which engage into corresponding cutouts 38 of the half-shells 26 or extend through the cutouts 38.

As can be seen in particular in FIG. 2, the fastening element 28 has a pair of opposite first protrusions 34 and a pair of opposite second protrusions 36, wherein the first protrusions 34 engage into cutouts 38 of the first part 22, and the second protrusions 36 engage into cutouts 38 of the second part 24. As a result, the two half-shells 26 are clipped to the fastening element 28. During the assembly of the two half-shells 26, the half-shells 26 are deflected in an elastic manner so that the protrusions 34, 36 can be inserted into the cutouts 38.

As can be seen in particular in FIG. 3, each protrusion 34, 36 has a lead-in chamfer 40 which makes it easier to insert the protrusions 34, 36 into the cutouts 38.

Figure 6:
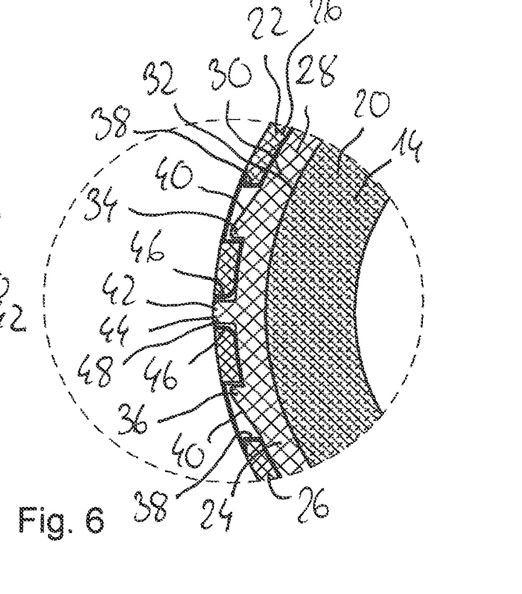
FIG. 6 shows an enlarged illustration of the detail VI from FIG. 5.

Between a first protrusion 34 and a second protrusion 36, the fastening element 28 has a respective centering element 42 which is configured in the form of a web 44 which extends in the longitudinal direction L of the assembly bearing. The centering element 42 engages into an opening 48 in a positively locking manner, said opening being formed by two opposite cutouts 38 of the half-shells 26, as can be seen in FIGS. 4, 5 and 6. The centering element 42 is used to center the two half-shells 26 relative to one another and also to position the supporting body 14 between the two half-shells 26.

As can also be seen in FIGS. 1 and 7, each of the half-shells 26 also has a positively locking connecting element 50 and a corresponding receptacle 52 for the connecting element 50. The connecting element 50 is configured in the form of a pin element 56 which projects from the abutment surface 54, and the receptacle 52 is configured in the form of a blind hole 58 which is introduced into the abutment surface 54 and into which the pin element 56 engages.

As can also be seen in FIG. 1, a depression 62, which corresponds to the contour of the fastening element 28 and in which the fastening element 28 is inserted in a positively locking manner, is introduced into an inner circumferential surface 60 of each half-shell 26. As a result, the supporting body 14 is fixed in an exact position in the half-shells 26.

Each of the half-shells 26 has a stop 64 on the inner circumferential surface 60, said stop being spaced apart from the inner part 12 delimiting the movements of the inner part 12 relative to the outer part 16, as can be seen in FIGS. 1 and 7.

A second embodiment of the assembly bearing 10 is described below, with the same reference designations being used for identical or functionally identical parts.

Figure 11:
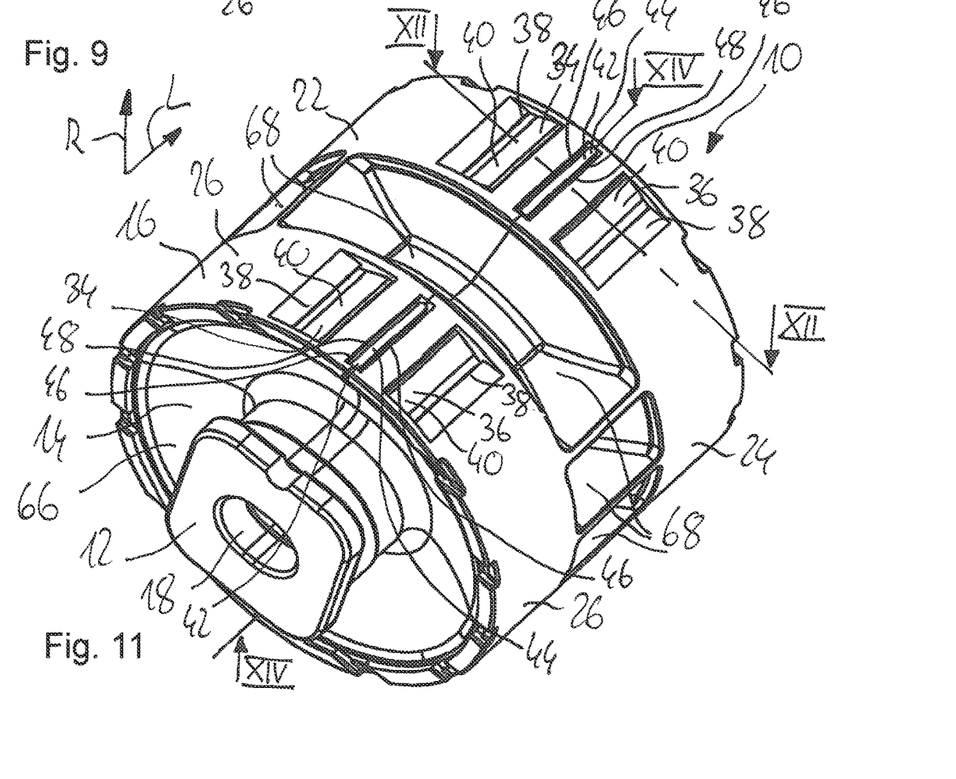
FIG. 11 shows a perspective illustration of the assembly bearing according to the second embodiment with clipped-together half-shells.
Figure 12:
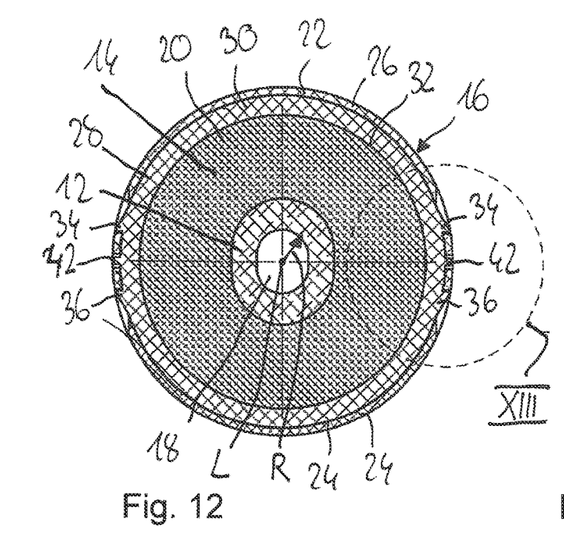
FIG. 12 shows a section along the line XII-XII from FIG. 11.
Figure 13:
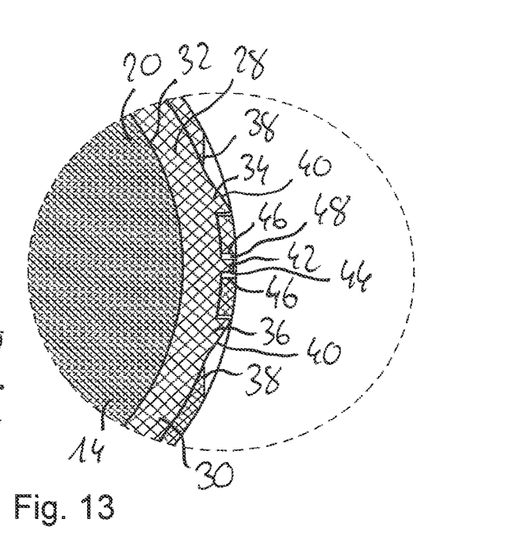
FIG. 13 shows an enlarged illustration of the detail XIII in FIG. 12.

FIGS. 8 to 14 show a second embodiment of the assembly bearing 10 which differs from the first embodiment in that the supporting body 14 has a second supporting spring 66, wherein each of the supporting springs 20, 66 is provided with a fastening element 28. In order to clip the two half-shells 26 to the two fastening elements 28, each of the half-shells 26 has four cutouts 38 into which the protrusions 34, 36 engage in the clipped-together state or through which the protrusions 34, 36 project, as can be seen in FIGS. 11 to 13.

Figure 14:
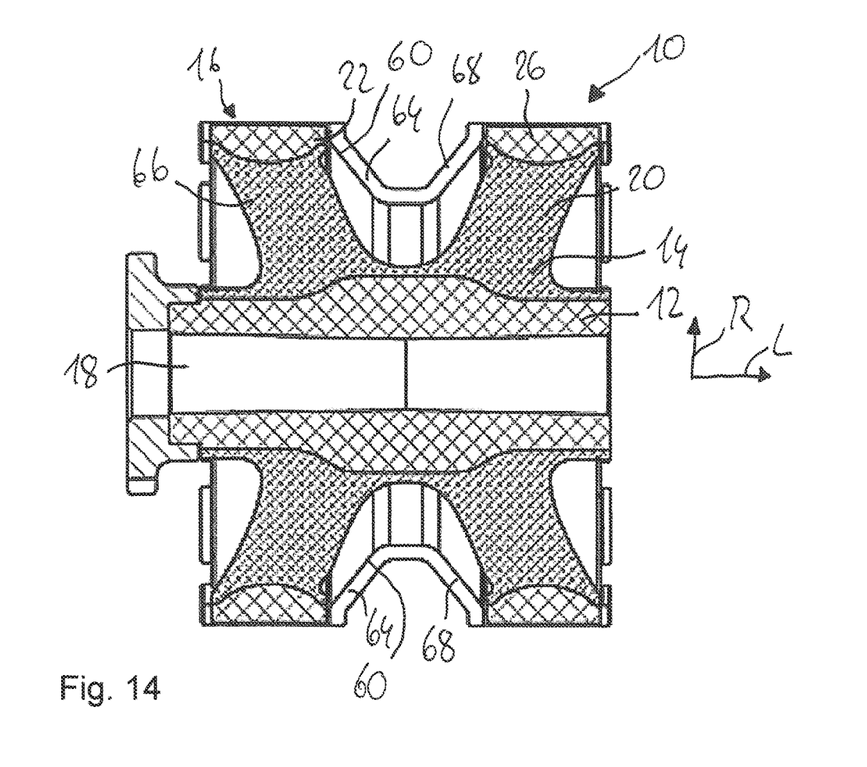
FIG. 14 shows a section along the line XIV-XIV in FIG. 11.

In the present case, the stop 64 is configured in the form of indentations 68 which are introduced into the half-shells 26 and which project radially inward from the inner circumferential surface 60. As can be seen in FIG. 14, in the clipped-together state of the half-shells 26, the indentations 68 are arranged between the two supporting springs 20, 66.

Figure 8:
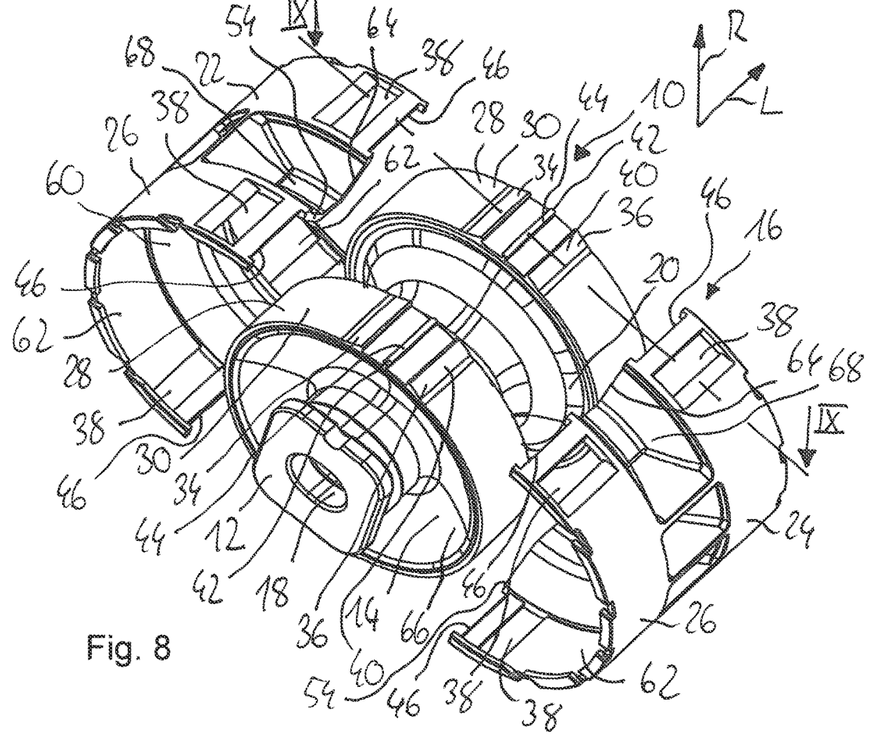
FIG. 8 shows a perspective illustration of an assembly bearing according to a second embodiment with two half-shells which are not clipped together.
Figure 9:
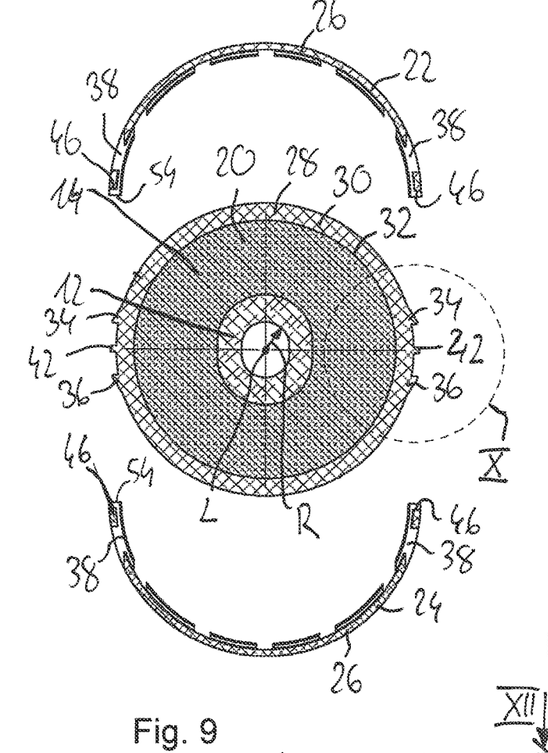
FIG. 9 shows a section along the line IX-IX from FIG. 8.
Figure 10:
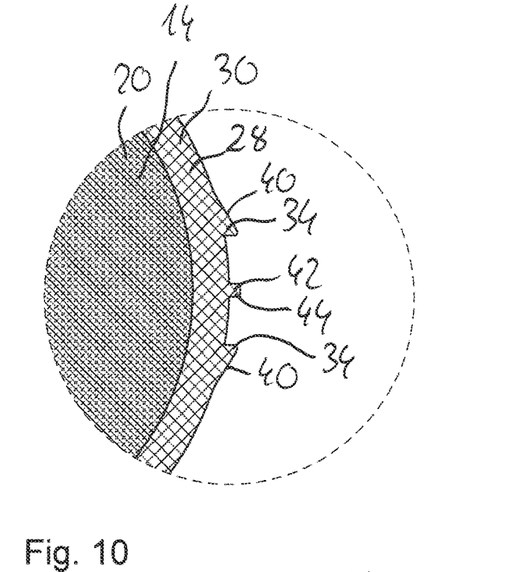
FIG. 10 shows an enlarged illustration of the detail X from FIG. 9.

As can be seen in FIG. 8, the half-shells 26 of the second embodiment have no positively locking connecting element 50 and no corresponding receptacle 52 for the connecting element 50. However, it is also conceivable, in accordance with the first embodiment, for the half-shells 26 to have a positively locking connecting element 50 and a corresponding receptacle 52 for the connecting element 50.

The assembly bearing 10 is distinguished by the outer part 16 formed of two half-shells 26 which are clipped to a fastening element 28 which is connected to the supporting body 14. As a result of the joining of the two half-shells 26, an encircling geometry is produced, which generates an undercut and thus an overlap which can be utilized as a stop 64. As a result, installation space-related requirements can be met, and also additional components causing additional costs can be avoided.

The invention claimed is:
1. An assembly bearing for a motor vehicle assembly, comprising:
   an inner part,
   an elastomeric supporting body in which the inner part is embedded, and
   an outer part which surrounds the supporting body,
   wherein the outer part has a first part and a separate second part which are clipped to at least one fastening element that surrounds the inner part and which is connected to the supporting body; the at least one fastening element has at least one pair of protrusions, and a first protrusion engages a cutout of the first part and a second protrusion engages a cutout of the second part to clip the first part and the second part to the fastening element.

2. The assembly bearing as claimed in claim 1, wherein at least one of the first part and the second part has at least one stop on an inner circumferential surface which faces the supporting body.

3. The assembly bearing as claimed in claim 1, wherein each protrusion has a lead-in chamfer for insertion into the cutout.

4. The assembly bearing as claimed in claim 1, wherein the at least one fastening element has at least one centering element which engages orifices of the first part and the second part in a positively locking manner.

5. The assembly bearing as claimed in claim 1, wherein each of the first part and the second part has a positively locking connecting element and a corresponding receptacle for the connecting element.

6. The assembly bearing as claimed in claim 1, wherein the fastening element is inserted, in a positive locking manner, into a depression formed in an inner circumference surface of each of the first and second parts.

7. The assembly bearing as claimed in claim 1, wherein the first part and the second part are configured in the form of half-shells and are connected to one another at opposite abutment surfaces.

8. The assembly bearing as claimed in claim 1, wherein the at least one fastening element is connected to the supporting body in a positively locking, force-fitting and/or materially bonded manner.

9. The assembly bearing as claimed in claim 1, wherein the fastening element is a ring element.

10. The assembly bearing as claimed in claim 1, wherein the fastening element and/or the first part and the second part are/is composed of plastic.

11. An assembly bearing for a motor vehicle assembly, comprising:
    an inner part,
    an elastomeric supporting body in which the inner part is embedded, and
    an outer part which surrounds the supporting body,
    wherein the outer part has a first part and a separate second part that are clipped to at least one fastening element that surrounds the inner part and which is connected to the supporting body; at least one of the first part and the second part has at least one stop on an inner circumferential surface which faces the supporting body; the at least one fastening element has at least one pair of protrusions; and a first protrusion engages a cutout of the first part and a second protrusion engages a cutout of the second part to clip the first part and the second part to the fastening element.

12. The assembly bearing as claimed in claim 11, wherein each protrusion has a lead-in chamfer for insertion into the cutout.

13. The assembly bearing as claimed in claim 11, wherein the at least one fastening element is connected to the supporting body in a positively locking, force-fitting and/or materially bonded manner.

14. The assembly bearing as claimed in claim 11, wherein the fastening element is a ring element.

15. The assembly bearing as claimed in claim 11, wherein the fastening element and/or the first part and the second part are/is composed of plastic.

16. An assembly bearing for a motor vehicle assembly, comprising:
    an inner part,
    an elastomeric supporting body in which the inner part is embedded, and
    an outer part which surrounds the supporting body,
    wherein the outer part has a first part and a separate second part that are clipped to at least one fastening element that surrounds the inner part and which is connected to the supporting body; at least one of the first part and the second part has at least one stop on an inner circumferential surface which faces the supporting body; and the at least one fastening element has at least one centering element which engages orifices of the first part and the second part in a positively locking manner.

17. The assembly bearing as claimed in claim 16, wherein the at least one fastening element is connected to the supporting body in a positively locking, force-fitting and/or materially bonded manner.

18. The assembly bearing as claimed in claim 16, wherein the fastening element is a ring element.

19. The assembly bearing as claimed in claim 16, wherein the fastening element and/or the first part and the second part are/is composed of plastic.

20. An assembly bearing for a motor vehicle assembly, comprising:
    an inner part,
    an elastomeric supporting body in which the inner part is embedded, and
    an outer part which surrounds the supporting body,
    wherein the outer part has a first part and a separate second part which are clipped to at least one fastening element that surrounds the inner part and which is connected to the supporting body; and the at least one fastening element has at least one centering element which engages orifices of the first part and the second part in a positively locking manner.

21. An assembly bearing for a motor vehicle assembly, comprising:
    an inner part,
    an elastomeric supporting body in which the inner part is embedded, and
    an outer part which surrounds the supporting body,
    wherein the outer part has a first part and a separate second part which are clipped to at least one fastening element that surrounds the inner part and which is connected to the supporting body; and the fastening element is inserted, in a positive locking manner, into a depression formed in an inner circumference surface of each of the first and second parts.

* * * * *